May 24, 1932.  V. J. CHAPMAN  1,860,172
WELDING APPARATUS
Filed Aug. 27, 1931
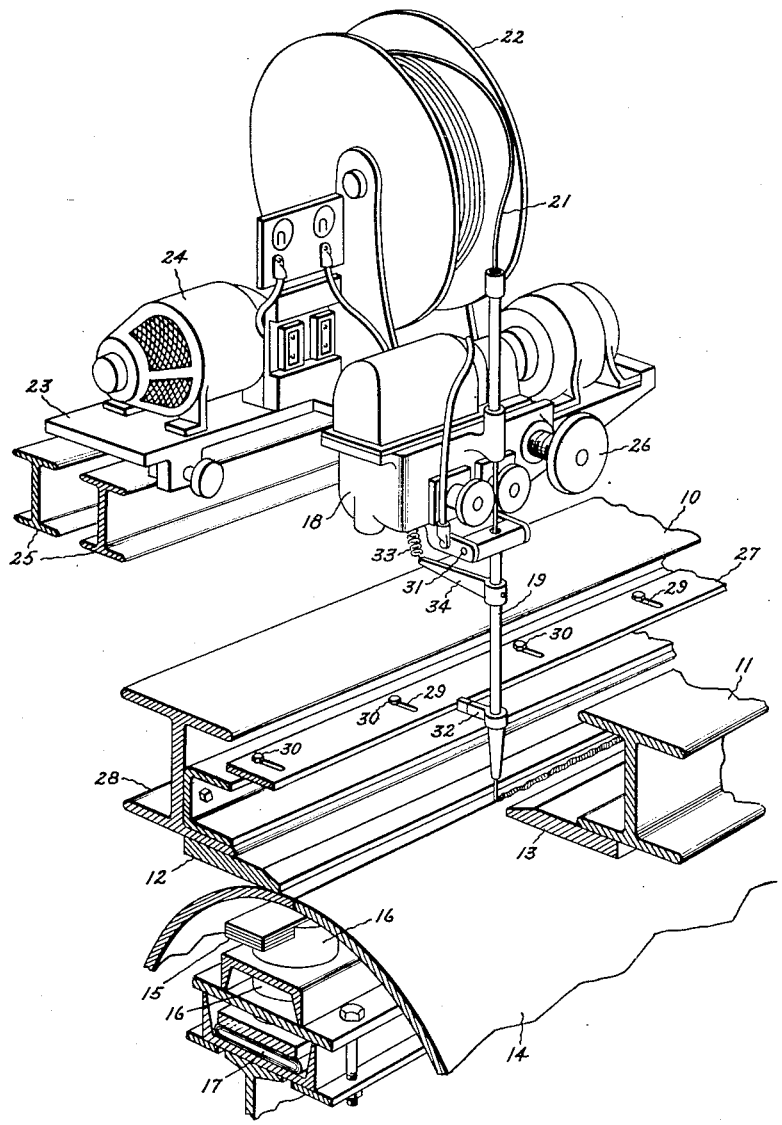
Inventor:
Verni J. Chapman,
by Charles E. Mullen
His Attorney.

Patented May 24, 1932

1,860,172

UNITED STATES PATENT OFFICE

VERNI J. CHAPMAN, OF SCHENECTADY, NEW YORK, ASSIGNOR TO GENERAL ELECTRIC COMPANY, A CORPORATION OF NEW YORK

WELDING APPARATUS

Application filed August 27, 1931. Serial No. 559,762.

My invention relates to welding apparatus and more particularly to apparatus for automatically welding seams of considerable length.

In such machines means are provided for holding the work in position for welding and additional means are provided for traversing the welding agency along the seam to be welded. The work holding means engages the work near the seam to be welded, but the means for traversing the welding agency along the seam is usually located at quite a distance from the seam. During welding the welding agency is moved over the seam to be welded and for the accomplishment of this purpose it is necessary that the means for traversing the welding agency travel in a path parallel to the seam. In machines constructed for welding long seams it is very difficult to align the traversing means with the work holding means and the seam in the work, and it is therefore necessary for the operator continually to adjust the welding agency relatively to the traversing means during the welding operation. Even if the traversing means were properly aligned with the work holding means, proper alignment of the traversing means with the seam in the work is often difficult because of the difficulty of properly aligning the seam relative to the work holding means, and this likewise necessitates continued adjustment of the welding agency relative to the traversing means during the welding operation.

It is an object of my invention to provide means closely adjacent the seam to be welded and preferably associated with the work holding means of a welding machine for automatically guiding the welding agency along the seam to be welded.

My invention will be better understood from the following description when considered in connection with the accompanying drawing which shows a partial sectional view of an automatic arc welding machine embodying my invention.

In the machine shown in the drawing, the work is held by a clamp of the construction illustrated and described in my Patent No. 1,640,437, granted August 30, 1927, for electric welding, and assigned to the same assignee as the present case. This clamp comprises holding members 10 and 11, having jaws 12 and 13 engaging one side of the work 14 on opposite sides of the seam to be welded and a flexible backing bar 15 engaging the other side of the work in back of the seam to be welded. The backing bar is forced into engagement with the work by a plurality of plungers 16, which are operated by means of distensible hose 17, the arrangement being such that the work is firmly clamped between it and the jaws 12 and 13 of the holding members 10 and 11.

The welding operation is performed by means of an automatic arc welding head 18. This welding head operates to feed toward the work through a nozzle member 19, electrode material 21 from a reel 22 supported on a travel carriage 23 which also acts as a support for the welding head. The travel carriage is traversed along the seam to be welded by motor 24 which propels it along track members 25 extending along the line of the seam to be welded. The welding head may be adjusted laterally with regard to the carriage 23 and track member 25 by means of a hand wheel 26.

The track members 25 will be arranged in the machine as nearly as possible in parallel relationship with the holding members 10 and 11 so that as the travel carriage traverses the welding agency along the seam to be welded, that agency will follow along the seam to be welded. However, it is not always possible to secure exact alignment, and in order to insure that the welding agency will travel immediately over the seam to be welded I provide means adjustably supported closely adjacent the seam to be welded for guiding the welding agency along the seam. This guiding means comprises in the illustrated embodiment of my invention, a guide rail or templet 27 supported on the holding member 10 through the agency of a channel member 28. The guide rail 27 is adjustably supported on the channel member 28 by means of slots 29 in said member and bolts 30 extending through said slots into channel member 28. The nozzle member 19 is pivotally supported at 31 on the welding head 18 and its lower portion is provided with an insulated sleeve member 32 which is held in engagement with the guiding surface of the guide rail 27 through the agency of a spring 33 acting on the nozzle member through an arm 34. This arrangement will insure that the arcing terminal of an electrode fed through the nozzle member 19 will follow along the seam when the guiding surface of the guide rail 27 is adjusted parallel to the seam to be welded irrespective of the alignment of the rails 25 and the travel of the welding carriage along these rails relative to the seam, and irrespective of the alignment of the seam in the work clamp. With this arrangement it will not be necessary for the welding operator continually to adjust the location of the welding head 18 relative to the travel carriage 23 by means of the hand wheel 26 since this adjustment is automatically accomplished by means of the templet or guide rail 27.

My invention is applicable to gas welding and gas-arc welding as well as arc welding. An automatic arc welding machine has been illustrated and described solely for the purpose of clearly setting forth the principles involved. It will be apparent that the invention is susceptible of being modified in many ways to meet the different conditions encountered in its use, and I therefore aim to cover by the appended claims all modifications within the true spirit and scope of my invention.

What I claim as new and desire to secure by Letters Patent of the United States is:—

1. Welding apparatus comprising means extending along the seam to be welded for holding the work in position for welding, a welding agency, means for traversing said welding agency along the seam to be welded, a templet adjustably supported on said holding means adjacent the seam to be welded, and means for biasing said welding agency into engagement with the guiding surface of said templet.

2. Welding apparatus comprising means extending along the seam to be welded for holding the work in position for welding, a welding agency, a travel carriage, means for pivotally supporting said welding agency from said travel carriage, a track for said travel carriage extending along the seam to be welded, a guide rail attached to said holding means, means for adjusting the guiding surface of said guide rail parallel to the seam to be welded, and means for biasing said welding agency into engagement with said guide rail.

3. Welding apparatus comprising means extending along the seam to be welded for holding the work in position for welding, a welding agency, means for traversing said agency along the seam to be welded, means for pivotally supporting said welding agency on said traversing means, a guide rail attached to said holding means, means for adjusting the guiding surface of said guide rail parallel to the seam to be welded, and means for biasing said welding agency into engagement with said guide rail.

4. Welding apparatus comprising a welding agency, a travel carriage, means for pivotally supporting said welding agency on said travel carriage, a track for said travel carriage extending along the seam to be welded, a guide rail closely adjacent the seam to be welded, means for adjusting the guiding surface of said guide rail parallel to the seam to be welded, and means for biasing said welding agency into engagement with said guide rail.

5. Welding apparatus comprising means extending along the seam to be welded for holding the work in position for welding, a welding agency, means for traversing said welding agency along the seam to be welded, means for pivotally supporting said welding agency on said traversing means, a guide rail adjacent the seam to be welded, means for adjusting the guiding surface of said guide rail parallel to the seam to be welded, and means for biasing said welding agency into engagement with said guide rail.

6. Arc welding apparatus comprising means extending along the seam to be welded for holding the work in position for welding, a travel carriage, a track for said travel carriage extending along the seam to be welded, a welding head mounted on said travel carriage, a nozzle member pivotally attached to said travel carriage for guiding electrode material fed by said welding head toward the work, a templet, means for adjustably attaching said templet to said holding means, and means for biasing said nozzle into engagement with the guiding surface of said templet.

In witness whereof, I have hereunto set my hand.

VERNI J. CHAPMAN.